United States Patent [19]
Takeda
[11] Patent Number: 4,611,376
[45] Date of Patent: Sep. 16, 1986

[54] MACHINE FOR PULL-ON AND PULL-OUT OF DAMPENER COVER OF OFFSET PRINTING PRESS

[75] Inventor: Hirofumi Takeda, Osaka, Japan
[73] Assignee: MMT Inc., Osaka, Japan

[21] Appl. No.: 725,488
[22] Filed: Apr. 22, 1985
[30] Foreign Application Priority Data
Apr. 26, 1984 [JP] Japan ................................. 59-82958
[51] Int. Cl.⁴ ................................................ B29C 27/30
[52] U.S. Cl. ........................................ 29/235; 29/244; 29/252
[58] Field of Search ......................... 29/244, 252, 235; 53/567, 576, 585, 370

[56] References Cited
U.S. PATENT DOCUMENTS
2,982,068 5/1961 Pape et al. ........................... 53/567
3,557,526 1/1971 Hartmann ............................. 53/567
3,662,514 5/1972 Goss ...................................... 53/567
4,144,631 3/1979 Fujio ..................................... 53/585

*Primary Examiner*—Robert C. Watson
*Attorney, Agent, or Firm*—Larson & Taylor

[57] ABSTRACT

A machine used for operations of pull-on and pull-out of a water dampener cover to and from the rubber roller of an offset printing press includes a roller holding apparatus for firmly holding the rubber roller constituting a main part of dampening roller or the used dampening roller with a water dampener cover fitted over the surface of the rubber roller and a cover pulling apparatus for pulling the water dampener cover fitted onto the one end of the rubber roller or the water dampener cover fitted over the whole surface of the water dampening roller in the axial direction of the rubber roller while grasping the one end of the water dampener cover to fit the cover over the rubber roller or remove the former from the latter.

6 Claims, 6 Drawing Figures

MACHINE FOR PULL-ON AND PULL-OUT OF DAMPENER COVER OF OFFSET PRINTING PRESS

BACKGROUND OF THE INVENTION

1. Field of the Invention

The present invention relates to a machine usable for operations of pull-on and pull-out of a dampener cover to and from the rubber roller of offset printing press and more particularly to a machine used for fitting a water feed cover over the rubber roller constituting a main part of dampening roller adapted to feed water to the printing surface of a printing drum in the offset printing press and removing the used cover from the rubber roller to replace it with new one.

2. Description of the Prior Art

As is well known in the art of offset printing, water is fed to the printing surface of a printing drum by using dampening roller and thereafter oil based ink is fed thereto by means of a rubber roller which serves to feed printing ink.

The water dampener roller is constructed by fitting a cover having a nature of good water absorption over the whole surface of the rubber roller. The cover is usually made of knit material in the cylindrical configuration and binding strings are provided at both the open ends of the cover.

When a cover is to be fitted over the surface of a rubber roller, the one open end of the cover is previously closed by tightening the binding string but the other open end is kept opened with an operator's hands. Thereafter, the cover is fitted onto the upper end of a rubber roller standing upright on the floor by handling with both the hands of an operator, it is then drawn downwardly and finally the other open end of the cover which has reached the lower end of the rubber roller is bound about the roller shaft by tightening the binding string. Thus, a cover fitting operation is achieved.

However, due to the remarkable progress of printing technology in the recent years there has been raised a requirement for more tight fitting of a cover over the whole surface of the rubber roller. To satisfactorily meet the requirement measures are taken such that the cover is strengthened and moreover it is modified so as to exhibit a nature of highly increased contractibility when it gets wetted with water. However, it takes a long time and a large amount of manpower that the thus improved and strengthened cover is manually fitted over the whole surface of the rubber roller in the same manner as in the case of the conventional dampening roller. Therefore, it becomes hard work. When the used cover is replaced with a new one, a cutter is usually used to tear the cover which is tightly fitted to the whole surface of the rubber roller but there is a danger of damaging the rubber roller or injuring an operator.

SUMMARY OF THE INVENTION

Thus, the present invention has been made with the foregoing background in mind and its object resides in providing a machine used for operations of pull-on and pull-out of a water dampener cover to and from the rubber roller of an offset printing press which assures that the cover is easily and reliably fitted over the whole surface of the rubber roller and, moreover, replacement of an used cover with new one is easily achieved without any necessity for a cutter or the like means merely by drawing it in the direction away from the roller.

It is another object of the present invention to provide a machine used for operations of pull-on and pull-out of a water dampener cover to and from the rubber roller of an offset printing machine which can be easily handled by an operator's hand.

It is another object of the present invention to provide a machine used for operations of pull-on and pull-out of a water dampener cover to and from the rubber roller of an offset printing machine which can be handle by means of a hydraulically operated device such as a hydraulic cylinder or the like.

To accomplish the above objects there is proposed according to the present invention a machine used for operations of pull-on and pull-out of a water dampener cover to and from the rubber roller of offset printing press which essentially comprises a roller holding apparatus for firmly holding the rubber roller (constituting a main part of the dampening roller or the used dampening roller with a water dampener cover fitted over the whole surface of the rubber roller) in the substantially horizontal posture and a cover pulling apparatus for pulling the water dampener cover fitted onto the one end of the rubber roller or the water dampener cover fitted over the whole surface of the dampening roller in the axial direction of the rubber roller while grasping the one end of the water dampener cover to fit the cover over the rubber roller or to remove the former from the latter.

Other objects, features and advantages of the invention will become more clearly apparent from a reading of the following description which has been prepared in conjunction with the accompanying drawings.

BRIEF DESCRIPTION OF THE DRAWINGS

The accompanying drawings will be briefly described below.

FIG. 1 is a front view of the machine.

FIG. 2 is a plan view of the machine in FIG. 1.

FIG. 3 is a fragmental enlarged sectional view of the machine, particularly illustrating how the cover is pulled by means of pulling ropes, and FIG. 4 is an enlarged front view of a manual rope winding section incorporated in the machine.

FIG. 5 is a front view of the machine, and

FIG. 6 is a plan view of the machine in FIG. 5.

DESCRIPTION OF THE PREFERRED EMBODIMENTS

Figures 1, 2:
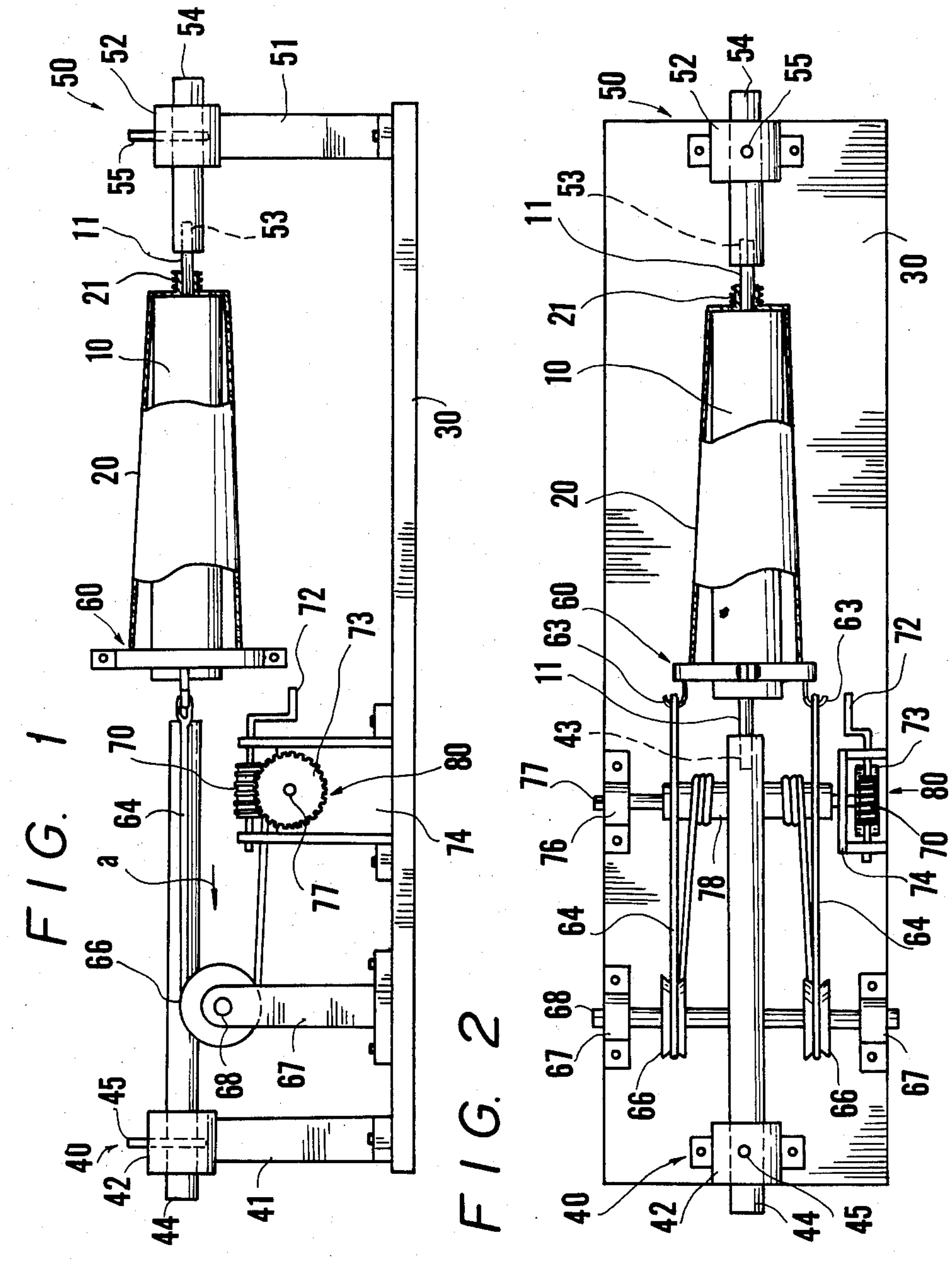
FIGS. 1 to 4 schematically illustrate a machine usable for operations of pull-on and pull-out of a water dampener cover to and from the rubber roller of offset printing press (hereinafter referred to simply as machine for the purpose of simplification) in accordance with the first embodiment of the invention.
Figure 3:
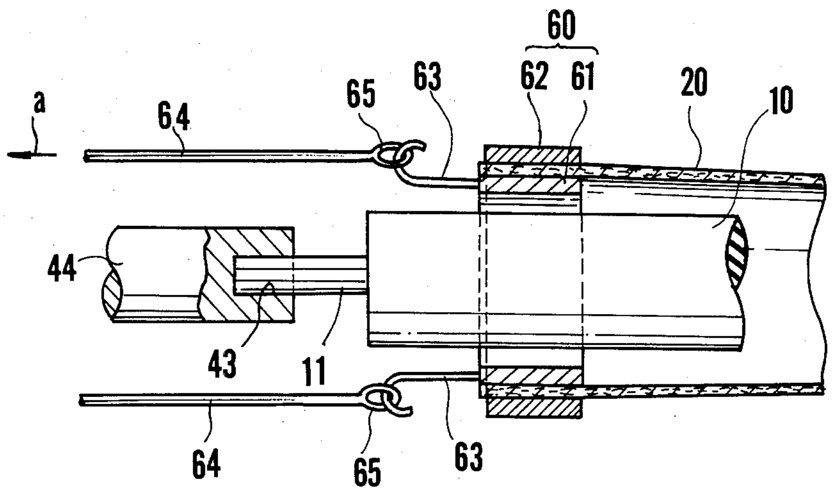
Figure 4:
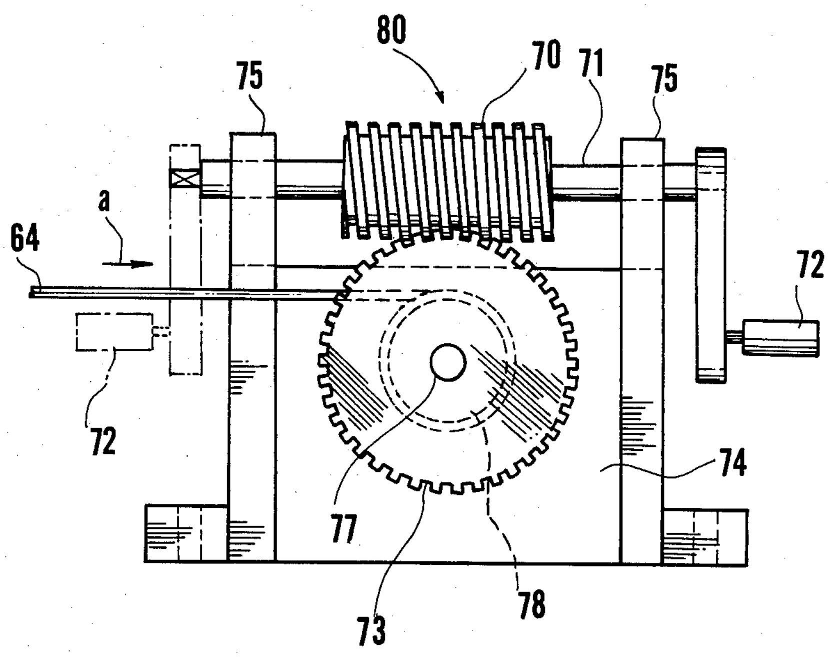

Now, the present invention will be described in a greater detail hereunder with reference to the accompanying drawings which illustrate preferred embodiments thereof.

First, description will be made below as to a machine in accordance with the first embodiment of the invention with reference to FIGS. 1 to 4. In the drawings reference numeral 10 designates a rubber roller constituting a main part of dampening roller. The rubber roller 10 includes roller shafts 11 at its both ends. Further, reference numeral 20 designates a water dampener cover which is formed to the cylindrical configuration to fit the dampening roller. Specifically, the water dampener cover 20 is made of knit material having a heavy thickness in the cylindrical configuration and has the nature of good water absorption. To firmly fix both the open ends of the cover 20 onto the roller shafts 11 strings 21 (one of which is not shown in the drawings) are provided at both the open ends of the cover.

Reference numeral 40 designates a lefthand roller holding section as seen in the drawings. The roller holding section 40 is constructed such that a roller support shaft 44 with a roller shaft insert hole 43 formed at the right end thereof is slidably supported in the horizontal posture in a bush 42 mounted on the top of a stand 41 at the left end of a base plate 30 and the roller support shaft 44 can be immovably held in the bush 42 by means of a fitting pin 45. Reference numeral 50 designates a righthand roller holding section. Specifically, the roller holding section 50 is constructed in the substantially same manner as the lefthand roller holding section 40 such that a roller support shaft 54 with a roller shaft insert hole 53 formed at the left end thereof is slidably supported in the horizontal posture in a bush 52 mounted on the top of a stand 51 at the right end of the base plate 30 and the roller support shaft 54 can be immovably held in the bush 52 by means of a fixing pin 55. Thus, a roller holding apparatus is constituted by a combination of the left-hand roller holding section 40 and the righthand roller holding section 50.

Reference numeral 60 designates grasping means for grasping the open end of the cover 20 around its inner and outer periphery. The grasping means 60 essentially comprises an the inner ring 61 of which inner diameter is determined to be larger than the outer diameter of the rubber roller 10 and an outer ring 62 adapted to be fitted onto the inner ring 61, as will be best seen in FIG. 3. The inner ring 61 is provided with a pair of hooks 63 at its lefthand end face as seen in the drawing which are adapted to come in operative engagement to eyelets 65 at the righthand ends of pulling ropes 64. As will be apparent from FIGS. 1 and 2, the ropes 64 are horizontally extended to V-shaped pulleys 66 which are mounted on a rotary shaft 68 which is bridged between an opposing pair of bearing stands 67 located in the proximity of the left end of the base plate 30 so that they are wound about V-shaped pulleys 66. Further, the other ends of the ropes 64 are fixed to a winding drum 78 mounted on a shaft 77 which is bridged between an opposing pair of channel-shaped bearing stands 74 and 76 located at the substantially middle part of the base plate 30. The one channel-shaped bearing stand 74 is provided with a worm wheel 73 on the winding shaft 77 so that the worm wheel 73 meshes with a worm 70 mounted on the rotary shaft 71 which is bridged between both the side walls 75 of the channel-shaped bearing stand 74 at its upper end. As is apparent from FIG. 4, a handle 72 is attached to the one end of the rotary shaft 71. Thus, a manual winding section 80 is constituted by a combination of worm 70 with handle 72 attached thereto, worm wheel 73, winding shaft 77 and winding drum 78 which are arranged in that way and, moreover, a manual cover pulling apparatus is constituted by a combination of pulling ropes 64, V-shaped pulleys 66 and manual winding section 80.

Next, the operations of the machine in accordance with the first embodiment of the invention will be described below.

First, the inner ring 61 is fitted onto the rubber roller 10 and the cover 20 is fitted onto one of the roller shafts 11. The rubber roller 10 is then fixedly held by both the roller holding section 40 and 50 so that the cover 20 is oriented toward the righthand roller holding section 50. Then, the right end of the cover 20 is firmly bound about the roller shaft 11 located at the righthand roller holding section 50 by using the string 21, while the other open end of the same is fitted with the inner ring 61 around the inner periphery thereof. Thereafter, the open end of the cover 20 with the inner ring 61 fitted thereto is tightened with the outer ring 62 from the outside whereby the open end of the same is grasped by the grasping means 60. Next, the hooks 63 on the grasping means 60 are engaged to the eyelets 65 of the ropes 64. After completion of engagement of the ropes 65 to the grasping means 60 the handle 72 is gradually rotated by an operator's hand so that the ropes 64 are wound around the winding drum 78 via the manual winding section 80. Thus, the cover 20 is ready to be pulled in the direction as identified by an arrow mark a. When it is confirmed that the rubber roller 10 is fully covered with the cover 20, an operator stops rotation of the handle 72, removes the grasping means 60 from the cover 20 and binds the open end of the cover 20 about the roller shaft 11 by using string which is provided around the open end of the cover 20 whereby a required dampening roller is built. Finally, the thus built dampening roller is disconnected from the roller holding apparatus and thereby the roller fitting operation is completed.

When the used cover is removed from the dampening roller to replace it with a new one after a certain period of running time elapses, the removing operation is achieved by way of the steps as described below.

First, the inner ring 61 is fitted into the used dampening roller and the assembly of dampening roller and inner ring is then fixedly supported by means of both the roller holding sections 40 and 50 which constitute the roller holding apparatus. Next, binding strings at both the ends of the cover 20 are loosened and the grasping means 60 is attached to the open end of the cover 20 located in the area of the lefthand roller holding section 40. The eyelets 65 at the one end of ropes 64 are engaged to the hooks 63 on grasping means 60 and thereafter the operator gradually rotates the handle 72 with his hand whereby the cover 20 tightly fitted over the rubber roller 10 is drawn. When the cover 20 is completely removed from the rubber roller 10, he stops rotation of the handle 72 and the rubber roller 10 is then removed from the roller holding apparatus whereby the cover removing operation is finished.

As will be readily apparent from the above description, the machine according to the first embodiment of the invention has an advantageous feature that a cover having a high intensity of contractive force can be very easily fitted merely by manually rotating the handle while the roller is fixedly supported with the aid of the roller holding apparatus. Another advantageous feature of the machine is that a used cover tightly fitted over the roller can be easily removed therefrom by way of the steps of loosening binding strings at both the ends of the roller and repeating the above-described operations. Thus, there is no necessity for the tearing of the used cover by means of a cutter or the like tool as is often seen with the conventional machine and, therefore, the removing operation is safely achieved without a fear of causing damage on the rubber roller or injuring an operator.

Next, description will be made below as to the machine in accordance with the second embodiment of the invention with reference to FIGS. 5 and 6. In the drawings reference numeral 10 designate a roller, reference numeral 11 designates a roller shaft, reference numeral 20 designates a cover and reference numeral 21 designates a string in the same way as in the foregoing embodiment.

Further, reference numeral 140 designates a lefthand roller holding section. Specifically, the lefthand roller holding section 140 is constructed such that a main cylinder 141 includes a main piston 142 with a roller shaft insert hole 143 formed at its foremost end. Reference numeral 150 designates a righthand roller holding section. The righthand roller holding section 150 is constructed such that a bush 152 adapted to receive the roller shaft 11 therein is carried on the top of a stand 151 at the right end of a base plate 130. Thus, a roller holding apparatus is constituted by a combination of the lefthand roller holding section 140 and the righthand roller holding section 150.

Figure 5:
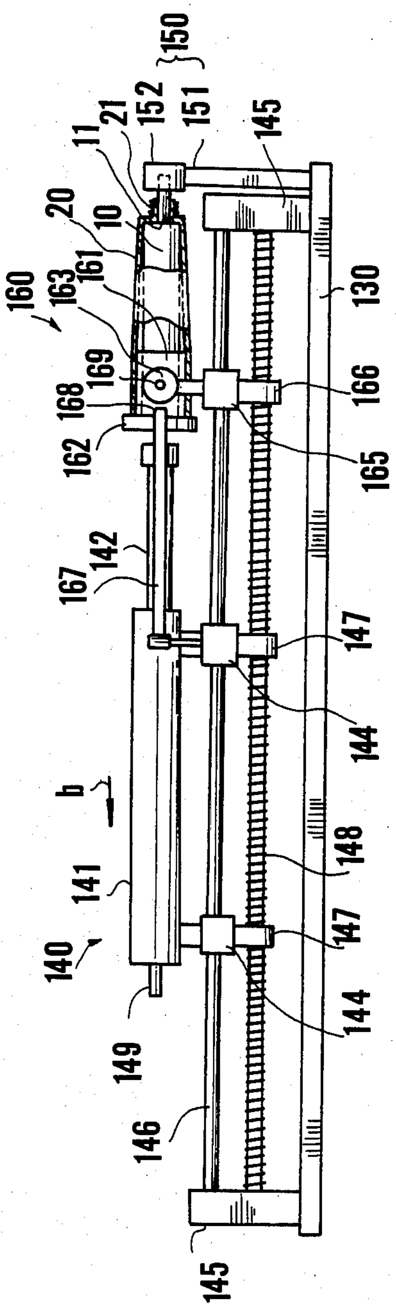
FIGS. 5 and 6 schematically illustrate a machine in accordance with the second embodiment of the invention.
Figure 6:
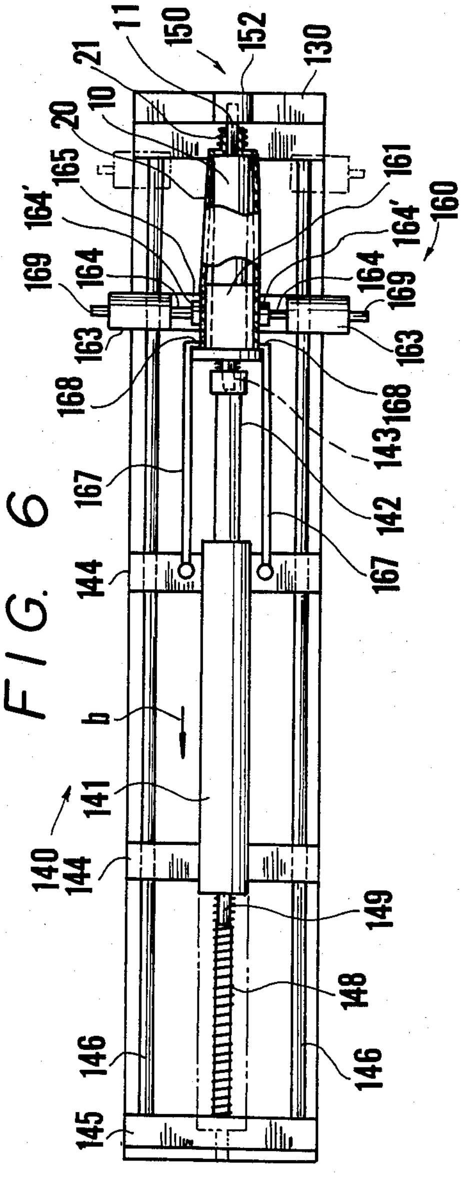

As will be apparent from FIG. 5, the main cylinder 141 is fixedly mounted on the upper surfaces of main cylinder supporting members 144 which are slidably supported along cylinder guide rods 146 which are extended in parallel with one another in the horizontal posture between both stands 145, one of them being located at the left end of the base plate 130 and the other one being located at the position in proximity of the right end of the same. Further, each of the main cylinder supporting members 144 has an openable nut 147 fixedly secured to the bottom thereof, the openable nut 147 being threadably engaged to a screw rod 148 which is located below the cylinder guide rods 146 while extending in the horizontal direction between both the stands 145. When the nuts 147 are opened, the main cylinder supporting members 14 are free to move, whereas when the nuts 147 are closed, they are threadably engaged to the screw rod 148 and therefore the cylinder supporting members 144 are immovably held by the latter. Reference numeral 149 designates a hydraulic passage.

In the drawings reference numeral 160 designates grasping means for grasping the open end of the cover 20. Specifically, the grasping means 160 essentially comprises a flanged inner pipe 161 having an inner diameter larger than the outer diameter of the rubber roller 10, the flanged inner pipe 161 being adapted to be fitted into the inner peripheral edge at the open end of the cover 20, and sub-pistons 164 with grasping pieces 164′ attached thereto at the foremost end which are adapted to abut against both the sides of the flanged inner pipe 161 by actuating sub-cylinders 163. The sub-cylinders 163 are fixedly secured to the upper surface of a sub-cylinder supporting member 165 which is slidably supported on the cylinder guide rods 146. An openable nut 166 adapted to be threadably engaged to the screw rod 148 is attached to the lower surface of the sub-cylinder supporting member 165 at its center. When the nut 166 is opened, the sub-cylinder supporting member 165 is free to move, whereas when the nut 166 is closed, the sub-cylinder supporting member 165 is threadably engaged to the screw rod 148 and therefore the sub-cylinder supporting member 165 is immovably held by the latter. Reference numeral 167 designates a pair of pulling rods with hooks 168 attached to their foremost end which are engaged to the flange 162 of the flanged inner pipe 161. The pulling rods 167 are fixedly secured to the upper surface of the main cylinder supporting member 144 on both the sides of the main cylinder 141. Thus, an automatic cover pulling apparatus is consisting mainly of a combination of main cylinder 141, main piston 142, main cylinder holding members 144 and pulling rods 167. In the drawings reference numeral 169 designates a hydraulic passage on each of the sub-cylinders 163.

Next, operations of the machine according to the second embodiment of the invention will be described below.

First, the flanged inner pipe 161 is fitted onto the rubber roller 10 and the cover 20 is fitted onto the one roller shaft. Next, the cover 20 is oriented toward the righthand roller holding section 150 and the rubber roller 10 is fixedly supported by means of the roller holding sections 140 and 150 which constitute the roller holding apparatus. The right end of the cover 20 is bound about the roller shaft 11 located in the area of the righthand roller holding section 150 by using string 21 and the flanged inner pipe 161 is inserted into the inner periphery around the left open end of the cover 20. Thereafter, the sub-cylinders 163 are actuated until the grasping pieces 164′ of the sub-pistons 164 come in abutment against the flanged inner pipe 161 whereby the open end of the cover 20 is grasped by means of the grasping means 160. Next, the hooks 168 at the right ends of the pulling rods 167 are operatively engaged to the flange 162 of the flanged inner pipe 161. When the thus assembled main cylinder 141 is actuated so as to allow the main piston 142 to be displaced outwardly, the roller shaft 11 is thrusted with the main piston 142. However, due to the fact that the latter is held immovably, the main cylinder 141 is caused to move in the leftward direction. As the main cylinder 141 is displaced in the leftward direction, the main cylinder supporting member 144, the pulling rods 167 and the grasping means 160 are displaced also in the leftward direction and thereby the cover 20 is pulled in the direction as identified by an arrow mark b. When it is confirmed that the rubber roller 10 is fully covered with the cover 20, actuation of the main cylinder 141 is stopped and the openable nuts 147 are closed whereby the main cylinder supporting members 144 are threadably engaged to the screw rod 148 and the sub-pistons 164 are retracted. Thus, the flanged inner pipe 161 can be removed from the cover 20. Thereafter, the open end of the cover 20 is bound about the roller shaft 11 by using string. As a result, a dampening roller is built. Finally, thus built dampening roller is removed from the roller holding apparatus and thereby the cover fitting operation is finished.

The removing operation of a used cover is achieved by way of the steps as described below so as to replace it with new one.

Prior to removing of the used cover from the dampening roller, the flanged inner pipe 161 is fitted onto the dampening roller and the latter is then immovably held by means of both the roller holding sections 140 and 150. Next, binding strings at both the ends of the cover 20 are loosened and the open end of the cover 20 located in the area of the lefthand roller holding section 140 is grasped with the aid of the grasping means 160. After the hooks 168 of the pulling rods 167 are engaged to the flange 162 of the flanged inner pipe 161, the main cylinder 141 is actuated in the leftward direction and thereby the cover 20 tightly fitted over the rubber roller 10 is pulled. When the cover 20 is fully removed from the rubber roller 10, actuation of the main cylinder 141 is stopped and thereafter the rubber roller 10 is displaced from the roller holding aparatus. Thus, the cover removing operation is finished.

As will be readily understood from the above description, the machine in accordance with the second embodiment of the invention has an advantageous feature that a cover having high intensity of contractive force can be very easily fitted merely by simple operations comprising the steps of immovably holding the rubber roller on the roller holding apparatus and displacing the main cylinder. Further, another advantageous feature of the machine is that replacement of a used cover with a new one is achieved simply and safely by way of the steps of loosening binding strings at both of the ends of the dampening roller and then repeating operations as described above to remove from the roller the cover which is tightly fitted over the latter.

While the present invention has been described above with respect to two preferred embodiments, it should of course be understood that it should not be limited only to them but various changes or modifications may be made in any acceptable manner without departure from the spirit and scope of the invention as defined by the appended claims.

What is claimed is:

1. A machine used for operations of pull-on and pull-off of a water dampener cover to and from the rubber roller on an offset printing press essentially comprising:

roller holding means adapted to support a pair of roller support shafts by means of bushes disposed at the ends of a base plate so as to slidably move in the substantially horizontal direction but be immovably held in said bushes, each of said roller support shafts being formed with a hole into which the roller shaft can be inserted;

grasping means for grasping the one end of the water dampener cover which has been fitted over the rubber roller; and cover pulling means for pulling the thus-grasped cover along and away from the rubber roller in the axial direction of the latter.

2. A machine as claimed in claim 1, wherein said grasping means is constituted by an inner ring adapted to be fitted into the open end of the water dampener cover, said inner ring having an inner diameter larger than the outer diameter of the rubber roller constituting a main part of the dampening roller and including hooks projected from the one end face thereof, and an outer ring disposed outside the inner ring and said cover to firmly hold the water dampener cover from the outside.

3. A machine as claimed in claim 1, Wherein said cover pulling means has pulling ropes extending around V-shaped pulleys, a worm wheel fixedly mounted on a winding shaft for winding ropes about a winding drum and a worm meshing with said worm wheel, said worm including a handle for rotating it.

4. A machine used for operations of pull-on and pull-out of a water dampener cover to and from the rubber roller of an offset printing press essentially comprising:

roller holding means constituted by a bush with a roller shaft insert hole formed therein, said bush being disposed on a base plate, and a main piston with a roller shaft insert hole formed therein, said main piston being operatively connected to a main cylinder which is supported on transversely extending main cylinder supporting members adapted to slidably move on cylinder guide rods in the direction away from the bush, said cylinder supporting members being able to be immovably held at a required position;

grasping means for grasping the open end of the water dampener cover which has been fitted over the rubber roller, and cover pulling means for pulling the thus-grasped cover along and away from the rubber roller in the axial direction of the latter.

5. A machine as claimed in claim 4, wherein said grasping means is constituted by a flanged inner pipe adapted to be fitted into the open end of the water dampener cover, said flanged inner pipe having an inner diameter larger than the outer diameter of the rubber roller constituting a main part of the dampening roller, and an opposing pair of sub-pistons disposed on both sides of the flanged inner pipe, each of said sub-pistons including a grasping piece adapted to firmly hold the water dampener cover from the outside and being operatively connected to a sub-cylinder which is supported on a transversely extending sub-cylinder supporting member adapted to slidably move on a cylinder guide rod.

6. A machine as claimed in claim 4, wherein said cover pulling means includes pulling rods, one end of each of said pulling rods being engaged to the one transversely extending cylinder supporting member adapted to slidably move on the cylinder guide rod in parallel with the base plate in the direction away from the bush and stop its movement at a required position and the other ends of the same being engaged to the flange of the flanged inner pipe adapted to be fitted into the one end of the water dampener cover.

* * * * *